Figure 1:
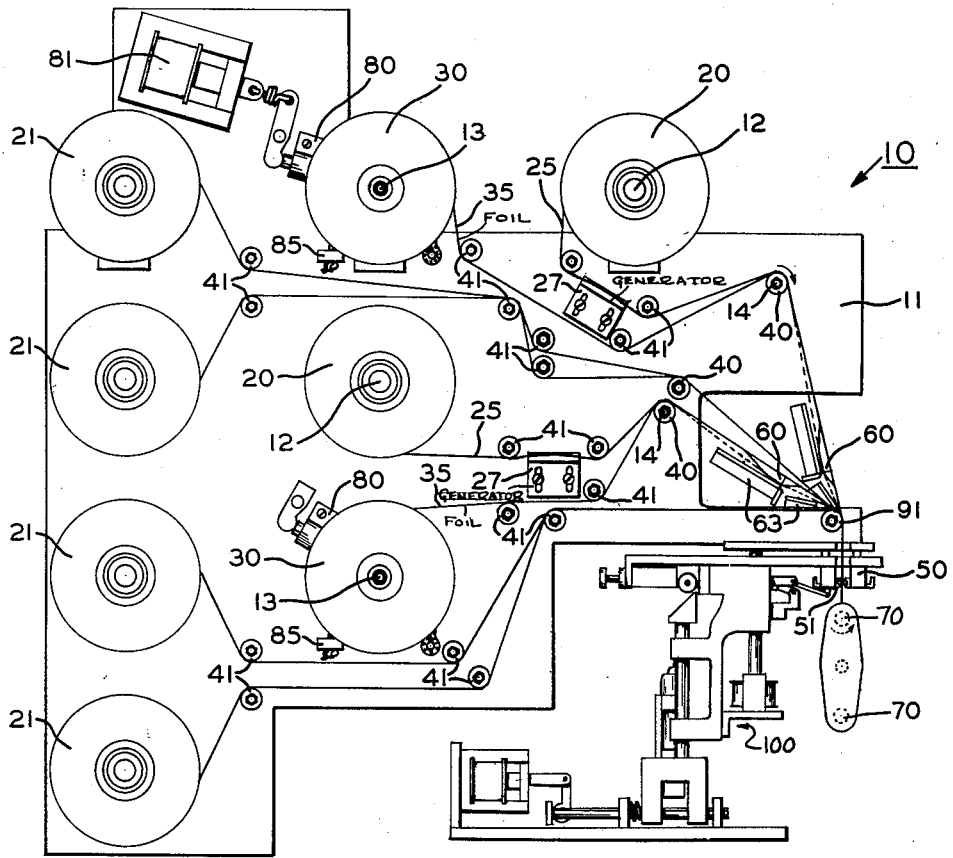

Oct. 11, 1960

E. J. BURKE 2,955,773

WINDING MACHINE

Filed Dec. 1, 1955

INVENTOR.
EARL J. BURKE
BY Roland C. Dexter

HIS ATTORNEY

United States Patent Office 2,955,773
Patented Oct. 11, 1960

2,955,773
WINDING MACHINE

Earl J. Burke, Stamford, Vt., assignor to Sprague Electric Company, North Adams, Mass., a corporation of Massachusetts Filed Dec. 1, 1955, Ser. No. 550,381

10 Claims. (Cl. 242—56.1)

This invention relates to capacitor winding machines, and more particularly to a fully automatic continuous operation capacitor winding machine.

With the advent of miniaturization of electronic components, several of the known difficulties encountered in the winding of capacitors have become of such importance that major changes in winding machines and techniques have become necessary.

Foremost among the many problems associated with the rolling of capacitors are those of cutting of the foil, transportation of the foil to the mandrel, and prevention of foil wrinkling.

Previous attempts at solving these problems have not proven satisfactory. Prior art methods of cutting foil often involve a two-step system of first providing a series of perforations across the foil, or snipping the edges of the foil, and then later breaking the foil by stopping the foil drums while continuing the pulling of the foil through the machine. Such a system is not well suited to the modern close tolerance requirements for capacitors, in that it produces uneven foil ends, wrinkling at the foil ends, and strains the foil to such as extent that elongation or even breaking may occur apart from the desired location.

Prior devices for transporting the severed foil to the winding mandrel for winding in the next successive capacitor, and prior devices for the prevention of foil wrinkling have involved the use of clamping rollers and delicate adjustment of back tension on the pay-off rolls, thereby greatly adding to the complexity and cost of winding machines. Despite this complex clamping action prior art devices have failed to surely and swiftly transport smooth foil to the winding mandrel because of slippage as the clamping action is relieved. Such slippage, with its resulting wrinkled and misaligned foil, produces capacitors of poor quality and uniformity.

The advent of miniaturization has brought on another major problem, that of providing short lengths of foil, to the order of two inches and less. Prior art devices have not been able to cut and handle such short lengths with any degree of accuracy. Attempts which have been made to handle short lengths by positioning the foil severing mechanism close to the mandrel, have not been successful in solving this problem because practical design limitations have prevented placement of the severing and winding mechanisms close enough together to provide the two inch foil lengths, and have presented a cluttered and awkward device, difficult to maintain and easily rendered inoperative.

It is an object of this invention to provide a capacitor winding machine which overcomes these and other deficiencies of the prior art devices.

It is another object of this invention to provide a device which cleanly cuts the foil, thereby providing smooth even leading and trailing edges for greater uniformity of foil lengths, and elimination of foil end wrinkles.

It is another object of this invention to provide a practical, economical and highly efficient system for transporting foil to the mandrel.

It is still another object of this invention to provide a positive means for the alignment of foil and paper to prevent foil wrinkling and to ensure proper placement of foil relative to paper.

It is a still further object of this invention to provide a capacitor rolling machine capable of handling extremely short lengths of foil.

For a better understanding of the invention, the principles involved in its instrumentation are briefly set forth.

In any capacitor winding machine in which many layers of ribbon-like material are convolutely wound about a driven mandrel, each layer travels at a different linear speed from the pay-off roll to the mandrel. That is, the layer closest to the mandrel wil travel the slowest and the outermost layer will travel the fastest. If these two layers travel over a common idler roll and onto a mandrel driven in the same direction as the rotation of the idler roll, it is soon discovered, if no slippage occurs, that the faster traveling layer has assumed control and has transmitted driving force from the mandrel to the idler roll thereby making the idler roll a control roll, to the extent that more of the slower layer will be pulled past the idler roll than is required by the mandrel. The result is that there is slack slower-layer material between the control idler and the mandrel, which slack in turn rolls into gathers and pleats in convolution with the faster layer on the mandrel. Now this would seem to require that each of these layers should travel over separate idler rollers for each change in direction on its path from reel to mandrel. However, such a practice would not be advantageous in that it would not be economical of space, or of idler rollers which have to be carefully machined and positioned, and more important, it would not take advantage of the useful force which one layer can be made to exert on another layer passing over the same idler roll.

There is a certain clutching action that occurs between layers of material when pulled over a common idler roll in superposed relation. This action is controlled by the layer of material having the greatest linear speed with reference to the driven winding mandrel. This is important in the case where the foil layers in a capacitor must be completely encased within the paper layers. Such complete encasement means that the foil must be cut before the paper is cut. This earlier cutting of the foil poses a problem of bringing the foil onto the mandrel for the winding of the next capacitor. Applicant has solved this problem by having the foil as the innermost layer on an idler roller and having one or more layers of paper overlie the foil layer on the same roller. Now this means thta if the superposed paper can be drawn over the common idler at a greater linear speed than the foil, there will be a clutching action which will clamp the foil between the paper and the roll and will result in the foil being drawn to the mandrel.

This clutching force is explained by consideration that the paper in passing to the mandrel passes over the idler which is not in the direct line between the pay-off reel and the mandrel. As the mandrel pulls the paper from the pay-off the paper attempts to find a straight path to the mandrel, and in so doing, clamps or clutches down on the idler. The foil, however, is not attached to the mandrel and hence does not try to find a straight path. This leaves the foil free to be caught up by the clutching action of the paper at the idler roll.

However, once the foil is caught in the convolutions on the mandrel and is then driven thereby, it is undesirable to have the overlying paper exert a clutching action. In other words, the paper must be made to exert a clutching action to aid in bringing the foil to the mandrel, then a declutching must be accomplished. Applicant has discovered that the declutching can be accomplished by driving the foil, once it is picked up by the mandrel, at a higher speed than the paper which overlies it on the idler roll. This means that the foil will have to be an outer winding, that is outer on the mandrel with respect to the layer which overlies it on the idler roll. This can be accomplished by having the mandrel turn in the opposite direction from the rotation of the idler roll, and is achieved by threading the foil and paper ribbons through the machine in such a manner that they will turn the idler roll in a direction opposite the travel of the driven mandrel.

A mandrel so driven will be pulling foil faster than it is pulling paper over the idler roll. Now the foil, like the paper, will be seeking a straight line path between the pay-off and the mandrel, and will be bearing down on the idler. The faster foil will exert a pulling force on the slower overlying paper, thereby lessening the radial force exerted on the roll by the paper. This pulling force will be only an instantaneous force before the paper which has no faster traveling layer bearing down on it will slip on the foil enough to balance the back tension, that is there will be no delay before the paper leaves the grasp of the foil. This will provide a declutching action at the idler roll so long as foil is being pulled; but it must be kept in mind that as set forth above, when the foil is cut and is no longer being pulled by the mandrel, the pulled paper will then clutch down onto the idler roll and pull the foil interposed between the paper and the idler to the mandrel. Then when the foil again reaches the mandrel and is pulled by the mandrel, it, being the outer layer on the mandrel, will again be pulled faster than the paper and will cause a declutching and slippage of the paper, so that the paper will not be pulled down to the mandrel faster than it is needed and will not be wrinkled or bunched.

Another way of explaining the need for controlling the clutching and declutching is that since it is apparent that the mandrel is incapable of pulling a layer faster than it is to be taken up by the mandrel, there must be some other pulling force which accounts for the slack which frequently occurs between the idler and mandrel. As set forth above, the drive force is translated to the idler through the faster traveling layer. This means that while the faster or outer layer on the mandrel is being pulled by the mandrel alone, the slower or inner layer on the mandrel is being pulled by the mandrel and by the idler which has obtained its driving force through the faster layer. If the slower layer can be made to slip on the faster layer when desired, then and only then is it expedient to use a common idler for the superposed layers. In the case of more than two layers the declutching occurs successively from the innermost layer to the outermost. This desired slippage can of course be obtained by brute force, as for example, by means of strong back tension on the pay-off rolls; however, slippage thus obtained is obtained at the expense of elongation and frequent breaking of the thin materials.

Applicant has recognized and applied the above disclosed basic principle that threading superposed layers through a winding machine so that the control idler roll turns in the opposite direction from the rotation of the driven winding mandrel will permit controlled clutching and declutching action. Any time that a ribbon must pass over an idler roll in such a manner as to turn the idler in the same direction as the driven mandrel, that ribbon should be alone in order to maintain the unique system of control disclosed by applicant. That is, any idler turning in the same direction as the mandrel should carry only one ribbon; and superposed layers may be guided by a common idler only when they turn the idler in the opposite direction from the direction of rotation of the driven mandrel if wrinkling is to be avoided.

A problem in rolling miniature capacitors has been that the lengths of foil are so short that the foil-cutting mechanism must be placed extremely close to the driven mandrel. This places a practical limit of about 4 inches as the shortest length of foil that can be rolled on the conventional machine. This limit has been considerably lessened by applicant by utilizing what may be termed the electrostatic attraction of foil for a charged paper. In practice this means that a charge is exerted on the paper which overlies the foil on the idler roll so that as the foil and paper approach the cutter the foil is attracted to the paper, but at the cutter an electrostatic shield is interposed between the foil and the paper to break this attraction and to allow the foil to be cut without cutting the paper. The foil is again picked up by the paper as soon as it passes the boundary or end of the electrostatic shield. This means that as the paper and foil are being pulled through the machine, the foil is in contact with the paper up to the time that the foil and paper are forceably separated by the electrostatic shield, and then the foil is again attracted to the paper almost immediately after it passes the electrostatic shield. The length of paper that is without foil as it passes beyond the electrostatic shield is very small, smaller in fact than any customary standard requirement of foil length in a capacitor. The foil is cut within the bounds of the electrostatic shield. This cut foil is immediately attracted to the charged paper and is carried thereby to the mandrel.

Perfect relative positioning of foil and paper are assured by not having any free foil below the shield. This enables the distance between the cutter and the mandrel to be greater than the foil length that is needed for a particular capacitor. This major contribution of applicant makes designing and engineering of capacitor rolling machines considerably simpler, in that the parts may be spaced for better maintenance. It should be noted, however, that even this requirement of a small gap at the cutter is not absolute. Lengths of foil shorter than the gap may be cut and handled by virtue of the strong electrostatic force which may be developed on the paper. In this case the extremely short lengths of foil fly up to the paper as soon as they are cut. Proper shielding should be maintained to ensure that these short lengths are attracted to only their own carrier paper.

The above stated general propositions have been reduced to practice in the embodiment of the drawing, which is illustrative only, and in no way intended to limit the invention.

Figure 3:
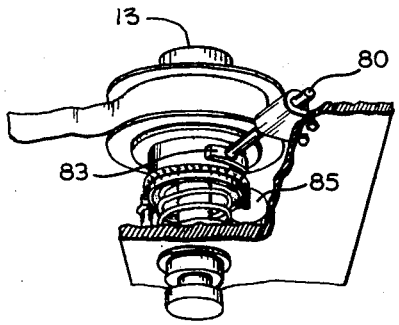
Figure 2:
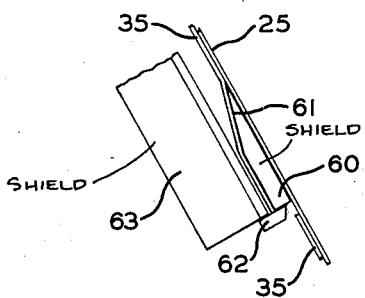

In Fig. 1 is a side view of the illustrative embodiment, showing the inventive subject matter in detail and the mandrel and clamp mechanisms which do not form part of this application in outline form only;

Fig. 2 is an enlarged fragmentary view of an electrostatic shield and foil cutter; showing the cutter immediately after severance of the foil; and Fig. 3 is an enlarged perspective view of a foil brake.

The capacitor winding machine is generally designated as 10, and comprises a suitable supported plate 11, upon which are mounted a plurality of shafts 12, 13 and 14 supporting paper reels 20 and 21, foil reels 30, and idler rolls 40 and 41, respectively. Although members 40 and 41 are shown in the preferred embodiment as idler rolls, they may be merely smooth curved surfaces which provide little frictional hinderence to the travel of the paper and foils. In order to ensure proper relative lateral positioning of the papers and foils, the control idler rolls 40 are located equidistant from gathering roll 91.

Paper 25 from each reel 20 slides over an electrostatic generator 27 (described infra) prior to coming in contact with foil 35 on idler roll 40. Paper from reels 21 need not slide or pass over generators 27 because these papers do not overlie foil on any idler roll. Foil 35 from the foil reels 30, which are provided with suitable brake means 80, is threaded over idler rolls 40 and 41 at each change in direction of travel in its path from pay-off reel to winding mandrel and is threaded through cutting mechanism 60, and through clamping mechanism 50, and onto mandrel 70.

Paper from paper reels 21, which are provided with conventional pressure brakes to establish the necessary back tension to prevent free unwinding is threaded over idler rolls 41, and through the clamping mechanism 50, and onto mandrel 70. Paper 25 from paper reels 20, which are also suitably detered from free unwinding, passes over idler rolls 40 in overlying relationship to the foil on rolls 40, and through the clamping mechanism 50 and onto mandrel 70.

Interposed in the path of foil 35 and paper 25 is an electrostatic system. This system comprises electrostatic generators 27 and electrostatic shields 61, 63. Generator 27 is preferably of aluminum, however, any other material capable of inducing an electrostatic charge on paper may be used. Generators 27 are constructed with a generally flat upright member, which is adjustably secured against plate 11, and a generally arcurate member secured to the flat member at right angles thereto, as a flange or foot of an L, and has a width which should at least equal the width of paper 25. An idler 41 is preferably positioned on plate 11 at each side of generator 27, and cooperatively serves with the adjustable mounting means of generator 27 to vary the pressure with which the paper ribbon passes over generator 27. Shields 61 and 63 are also flanged or of suitable width such that when interposed between a paper and a foil constitute a barrier to the attraction of the foil to the paper. Foil 35 passes through cutting mechanism 60 (best shown in Fig. 2) which comprises a wedge shaped electrostatic shield member 61 of steel or any other suitable material, which in addition serves by virtue of its shape and location to mechanically separate the foil from paper 25. Then the foil passes cutting blade 62, which cuts by a shearing action against the end of member 61, or against a separate anvil. Additional electrostatic shield members 63 are positioned about the shearing members to prevent the foil from being attracted to a paper other than its carrier paper.

Shafts 13 which support foil reels 30 are provided with drag members 85 to prevent free unwinding of foil. The shafts 13 are further provided with brake mechanism 80 actuated by solenoid 81. Brake 80 is shown as having a shoe 83 which bears against the shaft 13, however, any suitable brake action could be utilized, it being important only that a braking of the foil reel be provided at desired times during the operation of machine 10.

With the machine threaded as set forth above and shown in the drawing, that is with all the papers secured by one of the winding mandrels 70 of the multi-mandrel turret or arbor, power is supplied to the mandrel. All the papers and foils may be secured to the mandrel at this time so as to hasten the buildup of electrostatic charge on the papers 25 which is accomplished by having the papers 25 pass over their respective generators 27; however, only the papers need be threaded through to the mandrel inasmuch as the foils 35 will be picked up by the clutching action and electrostatic attraction of the papers 25 at idlers 40.

This is the clutching action disclosed above and is utilized by having paper 25 which overlies foil 35 on the idler 40 be a paper which is inside foil 35 on the mandrel. This provides the desired control of the layers, which is obtained only by utilizing the basic principle set forth by applicant. Before the foil is caught up by the mandrel the paper is the faster moving layer, and being the outer layer on the idler, will be pulled down onto the idler with such force as to clutch the under foil layer and pull it to the mandrel. When the foil reaches the mandrel, it, being outer on the mandrel, becomes the faster layer and will, as set forth above, establish a declutching on the control idler which leaves the paper layer free to slip so as to allow the under foil layer to pass at its faster rate. This locating of the paper as an inner member, as is disclosed in the general discussion of applicant's inventive concepts, is accomplished in this preferred embodiment by threading the ribbons through the machine in such manner that control idler 40 will be turned in a direction opposite to the direction of rotation of driven mandrel 70. Broadly stated, applicant's concept may be reduced by having mandrel turn in the opposite direction from the idler. It is, however, to be noted that in case a smooth curved surface is used instead of idler 40 that applicant's desired result is obtained so long as the foil is wound outside the paper which overlies it on the smooth curved surface. The time required for the buildup of the electrostatic charge may be lessened by applying heat at the generator 27.

Suitable timing means (not shown) may be set to actuate cutters 62 and clamping means 50 with its related cutter 51, so as to wind capacitors of any desired foil length.

The outer of the two foils in a capacitor must be longer than the inner foil, so as to end up even with the inner foil on a given radius of the capacitor. The outer foil may have an additional length sufficient to provide an extra wrap around the unit so as to completely shield the inner foil. The illustrated embodiment accomplishes this by mounting the cutter 60 of the outer foil a greater distance from the mandrel than the cutter for the inner foil. This could however, be accomplished by other suitable means, e.g. by placing the cutters equidistant from the mandrel and timing the firing so as to provide one foil longer than the other.

After the paper has developed an electrostatic charge as indicated by the foil having been attracted thereto on both sides of the shield 61, the machine may be operated automatically by the timing means.

The actuating means 100, which form no part of this application, controls the actuation, the timing and the sequence of operation of the brake 80, the foil cutter 60, the clamp 50, the cutter 51, and the orbiting of mandrel 70.

After the paper is charged, foil 35 is attracted to and attaches itself to paper 25 as they pass over the idler 40, and is then separated from the paper by the wedge shape of shield 61 and is then again attracted to the paper after passing the cutting edge of 61 and is carried by the paper to mandrel 70.

As soon as the foil is caught up by the convolutions on the mandrel, the foil becomes the faster moving of the two layers on idler 40 and the previously described declutching action sets in. This declutching occurs because the overdrive force applied to the now slower moving paper layer is reduced automatically until the layers slip on each other just enough to exactly balance the back tensions. This slipping of the paper on the foil is also useful in enhancing the electrostatic attraction set up on the paper.

Then the machine 10 is set on automatic, which means that the timing means at predetermined intervals, depending upon the foil lengths desired, fires the solenoid 81 which forces brake shoe 83 against the shaft 13 thereby stopping foil reel 30, and then again depending on the foil lengths desired, fires the cutter 62 cutting the foil.

In using applicant's machine one of three conditions must exist: (1) the length of foil desired is greater than the distance from mandrel to cutter; or (2) the length of foil desired is greater than the distance from gathering roll 91 to the cutter but less than the distance from mandrel to cutter; or (3) the foil length desired is less than the distance from gathering roll 91 to the cutter.

When condition (1) exists, that is when the foil length is great so that the foil to be cut is already caught up in the convolutions on the mandrel, the cutter must be fired substantially instantaneous with the stopping of the foil, so that the foil is cut when it is stopped, and as soon as it is stopped, so that there is no strain on the foil caught in the convolutions on the mandrel. The foil in condition (1) assumes the position between control idler 40 and gathering roll 91 that is shown in solid line in Fig. 1; that is, a single solid line is shown between control roll 40 and the leading edge of cutter 60 indicating adherence of foil to paper, then the foil is separated from the paper by the wedge and slides over the wedge and through the cutter, then after passing the cutting edge there is a slanted line back to the paper line to indicate that the foil passes only a short distance past cutter 60 before being drawn back to the paper by electrostatic attraction. No braking force, in addition to the ever present back drag to prevent free unwindings, is applied to the paper at this time so there is no slowing of the continuous winding mandrel. Paper 25 slides over stopped foil 35, and by virtue of the sliding action builds up a greater electrostatic charge. It should be noted that applicant has discovered that the charges generated by the paper sliding on the foil appear to be localized on the paper, so that while these charges are helpful and supplementary to the charges obtained at generator 27, they do not provide a substitute for the generator.

When condition (2) exists, that is, when the foil length is less than from the cutter to the mandrel, but more than from the cutter to the gathering roll, the cutter is not fired instantaneously with the braking of the foil. Instead the traveling paper builds up the frictional forces between the gathering roll 91 and the idler so that the foil is stretched taut between the rolls. The taut foil assumes the position between control roll 40 and gathering roll 91 that is shown in broken line in Fig. 1. Then the cutter 62 is fired, and since the cutting is a shearing of a taut foil, a very clean accurate cut is obtained. The cut foil flies to the traveling paper, and because applicant's electrostatic apparatus, as described, produces an even charge across the face of the paper, the foil is accurately positioned on the paper in the manner it was positioned prior to being separated from the paper by the wedgelike member 61. Suitable shields should be provided so that the free foil is attracted only to its carrier paper and to no other paper unless great spacing is provided.

When condition (3) exists, that is, when the extremely short foil lengths less than the distance from the cutter to the gathering roll are to be cut, the foil is cut almost instantaneously after the foil is stopped. However, this condition is distinguished from the almost simultaneous braking and cutting of condition (1), in that in condition (3) there is braking of the foil drum, then before the foil is cut there is a run of paper over the stopped foil so as to provide spacing between foil sections, and then the cutting. It should be noted that the rate of operation of the machine is such that the cutting takes place extremely shortly after braking, but not as in condition (1). Since this is the one condition where a loose foil is to be cut, it is imperative that the cutting action be a perfect shearing action. As indicated in the above discussion of condition (2), applicant's arrangement of producing an electrostatic charge on the entire length of paper as it passes the generator, and the enhancing of this charge as the paper is slid over the stopped foil at the idler roll make practical the cutting of these short free foil lengths.

The brake is kept on the foil reel for a predetermined interval after the cutting operation so that proper spacing of foils for successive capacitors may be obtained. During this post cutting interval, the cut foil is carried by the paper, which is not stopped during this time, to the mandrel; while the paper slides over the stopped foil to provide the spacing.

Next the brake 80 is released and foil 35 is drawn past the shearing edge 62 by the combined clutching and electrostatic attraction forces exerted by overlying paper 25.

When the foils have been encased in paper on the mandrel, the timing means actuates the clamping means 50, the cutting means 51, and the orbiting means of the multi-mandrel turret simultaneously. That is, the papers are clamped, cut and the turret starts its orbit, all at the same time. Then after this multi-operation has taken place, clamping means 50 starts to descend pulling papers with it. The clamping means 50 has a lower limit of travel which provides a sufficient space above the clamping jaws for the next mandrel to be brought into engagement with the papers above the jaw. This second mandrel secures the papers and starts winding the next unit. This winding action serves to pull the papers from the jaws of the clamping means. Then the clamping means is completely opened and rises to its normal position, that is to say, the jaws of the clamping means open to such an extent that they rise clear of the mandrel in their return to the upper or normal position. During this time the first mandrel, still bearing the first capacitor, is brought into contact with paper securing means, e.g. a glue pot and a presser foot, which seals the outer papers to prevent unrolling when discharged by the mandrel. When the mandrel turret is in position for the mandrel two to start winding, mandrel one is positioned for discharge of the wound unit, this may be accomplished by retracting the mandrel from the unit and providing a kick out means to push the rolled and secured unit into a collection device.

While a specific preferred embodiment of applicant's inventive concepts has been described, the broad general concepts may be applied to any driver so long as superposed layers pas over a common surface between source and driver, and may be applied to any attraction between close spaced layers.

While the term "paper" has been used throughout the disclosure of the preferred embodiment, applicant has utilized the same basic principles on other dielectric materials, e.g. plastic material. In a like manner, while the preferred embodiment involves a paper and a foil, the basic principles herein disclosed by applicant could be utilized to advantage on any layers traveling over a common surface, e.g. two papers traveling over the center of the three control idlers 40 in Fig. 1 of the drawing.

As many apparently different embodiments of this invention may be made without departing from the spirit and scope hereof, it is to be understood that the invention is not limited to the specific embodiment hereof except as defined in the claims.

I claim:

1. A method of convolutely winding a plurality of ribbons which include a ribbon of dielectric material comprising the steps of providing an electrostatic charge on said dielectric ribbon, passing the ribbons in superposed relationship around a common free moving surface, and winding the ribbons on a common winding means with the innermost of said plurality of ribbons on the common moving surface as the outermost of said plurality of ribbons on the winding means so that said dielectric ribbon assists in transporting said innermost ribbon to the winding means by a combination of frictional and electrostatic forces.

2. A method of convolutely winding a dielectric paper and a foil comprising pulling paper from a paper source by means of a driven winding mandrel past an electrostatic generator and around an idler roll located between the source and the mandrel, bringing a foil from a foil source around the idler roll beneath the paper, whereby the foil will be drawn to the mandrel by a combination of electrostatic attraction and clutching of the foil at the idler roll by the outer driven paper, and securing the paper and the foil to mandrel so that the foil is outside the paper in the windings on the mandrel.

3. A method of conveying lengths of foil by means of electrostatic attraction to a paper and by means of natural clutching forces, comprising placing an electrostatic charge on a dielectric paper, then drawing the charged paper over a foil on an idler roll, and then attaching the paper to a driver in such a manner that the idler roll turns in a direction opposite the direction of rotation of the driver.

4. A capacitor winding machine comprising support means for electrode and dielectric material, a mandrel for convolutely winding the electrode and dielectric material, an electrostatic generator for charging the dielectric material, and an electrostatic shield for shielding the electrode material from the dielectric material at a predetermined position between the support means and the mandrel.

5. A capacitor winding machine comprising support means for foil and paper supplies, winding means for convolutely winding foil and paper, freely movable guide means interposed between the support means and the winding means for guiding the paper superposed on the foil, means for producing a charge on the paper to attract the foil, and limiting means so positioned and arranged to negative the effect of the charge at a selected point, the winding means so constructed and arranged to wind the foil outside the paper which overlies the foil on the guide means.

6. A capacitor winding machine comprising support means for electrode and dielectric material, a mandrel for convolutely winding the electrode and dielectric material, an idler roll between the support means and the mandrel for a guide means for the electrode material with the dielectric material superposed, an electrostatic generator between the support and the idler roll for producing a charge on the dielectric material, an electrostatic shield between the idler roll and the mandrel for preventing attraction between the electrode and dielectric material for a predetermined space and driving means for the mandrel.

7. A method of winding a plurality of capacitor ribbons comprising drawing the ribbons from supply rolls, attaching one of the ribbons to a mandrel, passing said attached ribbon around an idler roll that is outside a direct line between the supply roll and the mandrel in such a manner that it overlies another of the plurality of ribbons on the idler roll, and driving the mandrel in such a manner that said attached ribbon is inside said other ribbon.

8. The method set forth in claim 7 wherein said attached ribbon overlies said other ribbon on all common surfaces between the supply rolls and the mandrel.

9. A method of using a capacitor winding machine having pay-off rolls, a drivable rotatable mandrel, and a plurality of idler rolls located between said pay-off rolls and said mandrel, said method comprising pulling capacitor electrode and dielectric material from said pay-off rolls around said idler rolls to establish a tortuous flow-path to said mandrel that is outside a direct line between said pay-off rolls and said mandrel with layers of said material overlying one another only on idler rolls that are so located in the tortuous path as to rotate opposite to the rotation of the mandrel, and with all idler rolls that rotate in the same direction as the mandrel having only a single layer of material.

10. A method of winding a capacitor having a metallic ribbon and a paper ribbon, said method comprising drawing said ribbons from supply rolls to a rotatable mandrel around a plurality of idler rolls to establish a tortuous path with said metallic ribbon outside said paper ribbon on said mandrel, and with said metallic ribbon under said paper ribbon on all common idler rolls, and with said metallic ribbon alone on all idlers rotating in the same direction as said mandrel.

References Cited in the file of this patent

UNITED STATES PATENTS

| | | |
|---|---|---|
| 1,940,847 | Danziger | Dec. 26, 1933 |
| 2,333,570 | Hild | Nov. 2, 1943 |
| 2,724,562 | Purdy | Nov. 22, 1955 |